(12) United States Patent
Svraka et al.

(10) Patent No.: US 12,345,192 B2
(45) Date of Patent: Jul. 1, 2025

(54) METHOD FOR CONTROLLING AT LEAST A PART OF AN EXHAUST AFTER TREATMENT SYSTEM OF A VEHICLE

(71) Applicant: Volvo Truck Corporation, Gothenburg (SE)

(72) Inventors: Irman Svraka, Gothenburg (SE); Åsa Högström, Gothenburg (SE); Björn Henriksson, Gothenburg (SE); Tobias Husberg, Kareby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/923,544

(22) Filed: Oct. 22, 2024

(65) Prior Publication Data

US 2025/0163839 A1    May 22, 2025

(30) Foreign Application Priority Data

Nov. 17, 2023   (SE) ..................................... 2351319-5

(51) Int. Cl.
*F01N 3/20*    (2006.01)

(52) U.S. Cl.
CPC ........... *F01N 3/208* (2013.01); *F01N 3/2073* (2013.01); *F01N 2610/02* (2013.01);
(Continued)

(58) Field of Classification Search
CPC ................. F01N 3/208; F01N 2610/02; F01N 2900/1616; F01N 2900/1622
See application file for complete search history.

(56) References Cited

U.S. PATENT DOCUMENTS

| 8,789,358 B2 | 7/2014 | Vosz |
| 9,803,532 B2 | 10/2017 | Li et al. |

(Continued)

FOREIGN PATENT DOCUMENTS

| DE | 102014216217 A1 | 2/2016 | |
| DE | 102018208129 A1 * | 11/2019 | .............. F01N 11/00 |

(Continued)

OTHER PUBLICATIONS

Machine translation of DE 102019008966 A1, accessed Mar. 5, 2025. (Year: 2025).*

(Continued)

*Primary Examiner* — Jonathan R Matthias
(74) *Attorney, Agent, or Firm* — Sage Patent Group

(57) ABSTRACT

A computer system comprising processing circuitry configured to: determine predicted vehicle operational information for a vehicle including at least predicted travel route for a vehicle, a predicted shutdown of a combustion engine of the vehicle along the predicted travel route, and a predicted subsequent re-start of the combustion engine; determine the topography of the predicted travel route subsequent to the predicted re-start of the combustion engine; determine a set ammonia storage level threshold of a selective catalytic reduction, SCR, catalyst arranged in an exhaust after treatment system to the combustion engine in response to the topography of the predicted travel route subsequent to the predicted combustion engine re-start; and control an injector of the exhaust after treatment system to inject a predetermined amount of reductant achieving the set ammonia storage level threshold prior to shutdown of the combustion engine.

20 Claims, 4 Drawing Sheets

(52) U.S. Cl.
CPC .. *F01N 2900/12* (2013.01); *F01N 2900/1616* (2013.01); *F01N 2900/1622* (2013.01); *F01N 2900/1814* (2013.01)

(56) References Cited

U.S. PATENT DOCUMENTS

| | | | |
|---|---|---|---|
| 11,739,674 | B2 | 8/2023 | Dahl |
| 2020/0031332 | A1 | 1/2020 | Koti et al. |
| 2020/0063632 | A1* | 2/2020 | Hendrickson ......... F01N 3/2066 |
| 2020/0263583 | A1 | 8/2020 | Balthes et al. |
| 2022/0003179 | A1 | 1/2022 | James et al. |
| 2022/0034249 | A1 | 2/2022 | Harnemo |
| 2022/0145789 | A1* | 5/2022 | Dahl ....................... F01N 3/021 |
| 2022/0412278 | A1* | 12/2022 | Volmerding .......... F02D 41/024 |

FOREIGN PATENT DOCUMENTS

| | | | | |
|---|---|---|---|---|
| DE | 102018214842 | A1 | | 3/2020 |
| DE | 102019008966 | A1 | | 6/2021 |
| DE | 102022208267 | A1 * | 3/2023 | ............. F01N 3/208 |
| EP | 2754871 | B1 | | 11/2017 |
| EP | 4023865 | A1 | | 7/2022 |
| WO | WO-2018046362 | A1 * | 3/2018 | ............... F01N 9/00 |

OTHER PUBLICATIONS

Swedish Search Report, Swedish Patent Application No. 2351319-5, mailed May 22, 2024, 3 pages.
Extended European Search Report, European Patent Application No. 24206721.3, mailed Mar. 17, 2025, 9 pages.

* cited by examiner

METHOD FOR CONTROLLING AT LEAST A PART OF AN EXHAUST AFTER TREATMENT SYSTEM OF A VEHICLE

CROSS REFERENCE TO RELATED APPLICATIONS

This application claims priority to Swedish Patent Application No. 2351319-5, filed on Nov. 17, 2024, the disclosure and content of which is incorporated by reference herein in its entirety.

TECHNICAL FIELD

The disclosure relates generally to operating management of exhausts after treatment system of a vehicle. In particular aspects, the disclosure relates to a method for controlling at least a part of an exhaust after treatment system of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A vehicle typically comprises an engine for propelling the vehicle. The engine may be powered by various means, such as e.g., by liquid or gaseous fuel in a combustion engine or an internal combustion engine. Alternatively, the vehicle may be propelled by electric power in an electric machine. Moreover, hybrid solutions exist in which the vehicle is propelled both by an internal combustion engine and an electric machine.

In order to clean the engine exhausts and reduce the emissions, the vehicle is typically provided an exhaust after treatment system (EATS) to handle emissions from the combustion engine. The components of an EATS may vary depending on the fuel used for powering the engine, but typically includes a filter and a selective catalytic reduction (SCR) catalyst. Urea, or an ammonia comprising substance, referred to as a reductant, is injected upstream of the SCR catalyst to assist in converting nitrogen oxides, also referred to as NOx, with the aid of a catalyst, into diatomic nitrogen ($N_2$), and water ($H_2O$). Depending on the composition of the reductant, carbon dioxide ($CO_2$) may also be produced. The cleaned, or at least emission-reduced, exhaust gases then leaves the EATS and the vehicle through the tailpipe of the vehicle.

Government regulations, together with a constant demand for increased fuel economy of the vehicle, require a more efficient control of the EATS. To secure high conversion efficiency of NOx, it is preferred to have sufficient high temperature, but also to have ammonia stored in the SCR catalyst, the capacity of the latter decreasing with an increasing temperature. The ammonia storage as well as the process for transforming the injected reductant into $NH_3$ are temperature dependent.

Thus, the operation of the EATS is relatively complex and depends on various parameters, and there is a need in the industry for an improved operation of the EATS to reduce emissions from the vehicle.

SUMMARY

According to a first aspect of the disclosure, a computer system comprising processing circuitry configured to: determine predicted vehicle operational information for a vehicle associated with the computer system including at least predicted travel route for the vehicle, a predicted shutdown of a combustion engine of the vehicle along the travel route, and a predicted subsequent re-start of the combustion engine; determine the topography of the predicted travel route subsequent to the predicted re-start of the combustion engine; determine a set ammonia storage level threshold of a selective catalytic reduction, SCR, catalyst arranged in an exhaust after treatment system to the combustion engine in response to the topography of the predicted travel route subsequent to the predicted combustion engine re-start; and control an injector of the exhaust after treatment system to inject a predetermined amount of reductant for providing ammonia to the SCR catalyst and achieving the set ammonia storage level threshold prior to shutdown of the combustion engine. The first aspect of the disclosure may seek to overcome problems with an insufficient ammonia storage level in the SCR catalyst upon a re-start of the combustion engine. That is, the first aspect prepares the SCR catalyst by injecting a reductant to adapt the ammonia storage level in the SCR catalyst to the operation of the SCR catalyst associated with the topography of the predicted travel route subsequent to the re-start of the combustion engine. A technical benefit may include reduced emission from the exhaust after treatment system. For example, emissions from the exhaust after treatment system, such as NOx emissions and ammonia slip, can be better controlled. Moreover, by adapting the ammonia storage level in the SCR catalyst prior to the shutdown of the combustion engine, and thereby preparing the SCR catalyst for the operation associated with the topography of the predicted travel route subsequent to the re-start of the combustion engine, an efficient control of the ammonia storage level in the SCR is provided. In other words, the processing circuitry is configured to increase the buffer in the SCR catalyst before an engine shutdown, in order to have sufficient ammonia stored in the SCR catalyst at engine re-start. Hereby, the SCR catalyst is less dependent on new injections of reductant, just after the engine re-start, as the ammonia stored in the SCR catalyst has been adapted for re-start. Moreover, the timing of when to inject the reductant to achieve the set ammonia storage level threshold is improved owing to the use of the predicted vehicle operational information. It should be noted that the predicted travel route subsequent to the predicted combustion engine re-start refers to the route which the vehicle is predicted to travel subsequent to the predicted re-start of the combustion engine. For example, the re-start of the combustion engine is predicted to occur somewhere along the travel route, e.g., on the same position, or a different position, of the predicted travel route as compared to where the shutdown of the combustion engine is predicted. The topography may thus be determined at least for the predicted travel route from the position of the predicted re-start of the combustion engine and onwards.

Optionally, in some examples, the processing circuitry is further configured to: determine a current ammonia storage level of the SCR catalyst; and determine a required change in ammonia storage level compared to the current ammonia storage level for reaching the ammonia storage level threshold. A technical benefit may include an efficient means for reaching the ammonia storage level threshold. Typically, the predetermined amount of reductant injected by the injector may correspond to the required change in ammonia storage level. The predetermined amount of reductant injected by the injector may correspond to an injection rate of the reductant applied for a predetermined injection time. Thus, the processing circuitry may be configured to control the injector to inject the predetermined amount of reductant, and thereby achieve the desired change in ammonia storage level, to reach the ammonia storage level threshold prior to shutdown of the combustion engine.

Optionally, in some examples, the required change in ammonia storage level compared to the current ammonia storage level corresponds to an increase or a decrease in ammonia storage level. A technical benefit may include an efficient means for reaching the ammonia storage level threshold, regardless of if the ammonia storage level threshold is lower or higher than the current ammonia storage level.

Optionally, in some examples, the processing circuitry is further configured to: evaluate the determined topography of the predicted travel route subsequent to the predicted re-start of the combustion engine, and in response to the topography of the predicted travel route being identified as belonging to a predefined group of downhill dominated topographies, determine that the set ammonia storage level threshold corresponds to a first predetermined amount of reductant to be injected by the injector prior to shutdown of the combustion engine, and in response to the topography of the predicted travel route being identified as belonging to a predefined group of uphill dominated topographies, determine that the set ammonia storage level threshold corresponds to a second predetermined amount of reductant to be injected by the injector prior to shutdown of the combustion engine, wherein the second predetermined amount is smaller than the first predetermined amount. A technical benefit may include an advantageous strategy for preparing the SCR catalyst for the operation associated with the topography of the predicted travel route subsequent to the re-start of the combustion engine. Hence, the processing circuitry may be configured to evaluate the determined topography and compare the result to predefined groups of topographies, i.e., at least the group of downhill dominated topographies and the group of uphill dominated topographies. A downhill dominated topography may e.g., be defined by that the predicted travel route subsequent to the combustion engine re-start comprises more, or overall steeper, downhills than uphills. For example, the end position of the predicted travel route subsequent to the combustion engine re-start is located at an elevation lower than the position of the predicted travel route corresponding to the combustion engine re-start. Correspondingly, an uphill dominated topography may e.g., be defined by that the predicted travel route subsequent to the combustion engine re-start comprises more, or overall steeper, uphills than downhills. For example, the end position of the predicted travel route subsequent to the combustion engine re-start is located at an elevation higher than the position of the predicted travel route corresponding to the combustion engine re-start. The processing circuitry may e.g., have access to such groups of uphill and downhill dominated topographies by means of one or more look-up tables. Thus, the identification of such topographies may be carried out in response to the predicted vehicle operational information, utilizing e.g., map data, and mapping it to the one or more look-up tables.

Optionally, in some examples, the first predetermined amount of reductant to be injected by the injector prior to shutdown of the combustion engine corresponds to the maximum amount of reductant which the injector is able to inject prior to shutdown of the combustion engine. A technical benefit may include a maximization of the ammonia storage, or at least the maximum achievable ammonia storage considering the circumstances, for the SCR catalyst prior to shutdown of the combustion engine. That is, in case the determined topography indicates a need of a high, or an as high as possible, ammonia storage level in the SCR catalyst subsequent to the combustion engine re-start, the processing circuit may control the injector to inject reductant to maximize the ammonia storage in the SCR catalyst prior to the shutdown of the combustion engine.

Optionally, in some examples, the processing circuitry is further configured to: determine the topography of the predicted travel route subsequent to the predicted re-start of the combustion engine for a predetermined distance along the travel route. A technical benefit may include a well-define distance of the predicted travel route subsequent to restart of the combustion engine. For example, the predetermined distance may extend from a start position of the predicted travel route corresponding to the position of the re-start of the combustion engine, to an end position of the predicted travel route. The position of the predicted travel route corresponding to the position of the shutdown of the combustion engine may be the same as the start position, or may be arranged upstream of the start position. That is, the topography which the processing circuitry determines, is that of the predetermined distance of the predicted travel route which the vehicle is predicted to travel subsequently to re-starting of the combustion engine. For example, the subsequent 1 km, 2 km or 3 km of the travel route which the vehicle is predicted to travel after re-starting of the combustion engine.

Optionally, in some examples, the processing circuitry is further configured to: predict NOx emissions out of the exhaust after treatment system for the vehicle travelling on the predicted travel route with the predicted topography; compare the predicted NOx emissions with a predetermined NOx emission threshold; and determine the set ammonia storage level threshold in response to a difference between the predicted NOx emissions and the predetermined NOx emission threshold. A technical benefit may include an efficient way to ensure that the NOx emission out of the exhaust after treatment system as the vehicle travels along the predicted travel route subsequent to the combustion engine re-start is below the NOx emission threshold. That is, the processing circuitry may be configured to prepare the SCR catalyst with an ammonia storage level adapted to handle NOx emission out of the exhaust after treatment system as the vehicle travels along the predicted travel route subsequent to the combustion engine re-start.

Optionally, in some examples, the processing circuitry is further configured to: predict ammonia slip out of the exhaust after treatment system for the vehicle travelling on the predicted travel route with the predicted topography; compare the predicted ammonia slip with a predetermined ammonia slip threshold; and determine the set ammonia storage level threshold in response to a difference between the predicted ammonia slip and the predetermined ammonia slip threshold. A technical benefit may include an efficient way to ensure that the ammonia slip out of the exhaust after treatment system as the vehicle travels along the predicted travel route subsequent to the combustion engine re-start is below the ammonia slip threshold. That is, the processing circuitry may be configured to prepare the SCR catalyst with an ammonia storage level adapted to handle ammonia slip out of the exhaust after treatment system as the vehicle travels along the predicted travel route subsequent to the combustion engine re-start.

Optionally, in some examples, the SCR catalyst is a pre-SCR catalyst arranged upstream of a main SCR-catalyst in the exhaust after treatment system or, wherein the SCR catalyst is the main-SCR catalyst arranged downstream of the pre-SCR catalyst. A technical benefit may include efficient preparation of the ammonia storage level of the SCR catalyst regardless of if the SCR catalyst is a pre-SCR catalyst or a main SCR-catalyst. Moreover, for exhaust after treatment systems having both a pre-SCR catalyst and a main SCR-catalyst, both the pre-SCR catalyst and a main SCR-catalyst may be subject to the set ammonia storage level threshold prior to shutdown of the combustion engine, as previously described.

Optionally, in some examples, the processing circuitry is configured to predict NOx emissions and/or the predict ammonia slip in response to predicted engine speed and/or predicted engine torque of the predicted vehicle operational information for the vehicle travelling along the predicted travel route subsequent to combustion engine re-start.

Optionally, in some examples, the processing circuitry is configured to determine the topography of the predicted travel route subsequent to the predicted re-start of the combustion engine by map data, and/or topography data. For example, the map data includes road topography. The map data may additionally include predicted road conditions and predicted road events, for example, current or predicted traffic conditions (e.g., expected traffic jams) and upcoming crossings, train crossings, parking lots, traffic lights or the like. It should be noted that the predicted vehicle operational information is related to future, expected or predicted operation of the vehicle, typically associated with an associated operation of the SCR catalyst. The predicted vehicle operational information may be expected to occur in the near future, e.g., in 10 s to 30 min, or in 30 s to 15 min, or in 1 min to 15 min. The vehicle may additionally be equipped with a GPS or other positional sensor system. For example, the processing circuitry may be configured to determine the topography of the predicted travel route subsequent to the predicted re-start of the combustion engine by map data, topography data, and or vehicle positional data.

According to a second aspect of the disclosure, a vehicle comprising the computer system of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure. The vehicle may e.g., comprise an exhaust after treatment system comprising the SCR catalyst as previously described.

Optionally, in some examples, the vehicle further comprises an electric machine for propelling the vehicle in addition to the combustion engine. A technical benefit may include continuous propelling of the vehicle using the electric machine when the combustion engine is shutdown. Thus, the processing circuitry of the computer system may be configured to operate the electric machine for propelling the vehicle along the predicted travel route, and to shut down the combustion engine while the electric machine is propelling the vehicle. According to a third aspect of the disclosure, a computer-implemented method is provided. The method comprises determining, by processing circuitry of a computer system, predicted vehicle operational information including at least a predicted travel route for a vehicle, a predicted shutdown of a combustion engine of the vehicle along the travel route, and a predicted subsequent re-start of the combustion engine; determining, by the processing circuitry, the topography of the predicted travel route subsequent to the predicted re-start of the combustion engine; determining, by the processing circuitry, a set ammonia storage level threshold of a selective catalytic reduction, SCR, catalyst arranged in an exhaust after treatment system to the combustion engine in response to the topography of the predicted travel route subsequent to the predicted combustion engine re-start; and controlling an injector of the exhaust after treatment system to inject a predetermined amount of reductant for providing ammonia to the SCR catalyst and achieving the set ammonia storage level threshold prior to shutdown of the engine.

The third aspect of the disclosure may seek to solve the same problem as described for the first aspect of the disclosure. Thus, effects and features of the third aspect of the disclosure are largely analogous to those described above in connection with the first aspect of the disclosure, and will not be repeated here. The processing circuitry is e.g., that of the first aspect of the disclosure.

Optionally, in some examples, the method further comprises: determining, by the processing circuitry, a current ammonia storage level of the SCR catalyst; and determining, by the processing circuitry, a required change in ammonia storage level compared to the current ammonia storage level for reaching the ammonia storage level threshold. The method may comprise: controlling the injector to inject the predetermined amount of reductant and achieving the desired change in ammonia storage level to reach the ammonia storage level threshold prior to shutdown of the engine.

Optionally, in some examples, the injector is controlled to achieve the required change in ammonia storage level compared to the current ammonia storage level by an increase or a decrease in ammonia storage level. Thus, the method may comprise: Increasing or decreasing the injection rate of the reductant.

Optionally, in some examples, the method further comprises: evaluating, by the processing circuitry, the determined topography of the predicted travel route subsequent to the predicted re-start of the combustion engine; determining, by the processing circuitry, that the set ammonia storage level threshold corresponds to a first predetermined amount of reductant to be controlled to be injected by the injector prior to shutdown of the combustion engine in response to the topography of the predicted travel route being identified as belonging to a predefined group of downhill dominated topographies; and determining, by the processing circuitry, that the set ammonia storage level threshold corresponds to a second predetermined amount of reductant to be controlled to be injected by the injector prior to shutdown of the combustion engine in response to the topography of the predicted travel route being identified as belonging to a predefined group of uphill dominated topographies, wherein the second predetermined amount is smaller than the first predetermined amount.

Optionally, in some examples, the first predetermined amount of reductant to be injected by the injector prior to shutdown of the engine corresponds to the maximum amount of reductant which the injector is able to inject prior to shutdown of the engine. Thus, the method may comprise: controlling the injector to inject the maximum amount of reductant which the injector is able to inject prior to shutdown of the engine.

Optionally, in some examples, the method further comprises: determining, by the processing circuitry, the topography of the predicted travel route subsequent to the predicted re-start of the combustion engine for a predetermined distance along the predicted travel route.

Optionally, in some examples, the method further comprises: predicting, by the processing circuitry, NOx emissions out of the exhaust after treatment system for the vehicle travelling on the predicted travel route with the predicted topography; comparing, by the processing circuitry, the predicted NOx emissions with a predetermined NOx emission threshold; wherein determining the set ammonia storage level threshold is performed in response to a difference between the predicted NOx emissions and the predetermined NOx emission threshold.

Optionally, in some examples, the method further comprises: predicting, by the processing circuitry, ammonia slip out of the exhaust after treatment system for the vehicle travelling on the predicted travel route with the predicted topography; comparing, by the processing circuitry, the predicted ammonia slip with a predetermined ammonia slip threshold; wherein determining the set ammonia storage level threshold is performed in response to a difference between the predicted ammonia slip and the predetermined ammonia slip threshold.

According to a fourth aspect of the disclosure, a computer program product comprising program code for performing, when executed by the processing circuitry, the method of the third aspect of the disclosure is provided. The processing circuitry is e.g., that of the first aspect of the disclosure.

According to a fifth aspect of the disclosure, non-transitory computer-readable storage medium comprising instructions, which when executed by the processing circuitry, cause the processing circuitry to perform the method of the third aspect of the disclosure is provided. The processing circuitry is e.g., that of the first aspect of the disclosure.

The fourth to fifth aspects of the disclosure may seek to solve the same problem as described for the first aspect of the disclosure. Thus, effects and features of the fourth to fifth aspects of the disclosure are largely analogous to those described above in connection with the first aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

The disclosed technology may solve the problem relating to insufficient ammonia storage level in the SCR catalyst upon a re-start of the combustion engine. The disclosed technology prepares the SCR catalyst by injecting a reductant to adapt the ammonia storage level in the SCR catalyst to the predicted operation of the SCR catalyst subsequent to the re-start of the combustion engine. The predicted operation of the SCR catalyst is associated with the topography of the travel route which the vehicle is predicted to travel. A technical benefit may include reduced emission from the exhaust after treatment system during the upcoming travel of the vehicle along the predicted travel route. By adapting the ammonia storage level in the SCR catalyst to the predicted operation of the SCR catalyst subsequent to the re-start of the combustion engine, emissions from the exhaust after treatment system, such as NOx emissions and ammonia slip, can be better controlled. Moreover, by adapting the ammonia storage level in the SCR catalyst prior to the shutdown of the combustion engine, and thereby preparing the SCR catalyst for the operation associated with the topography of the predicted travel route, an efficient control of the ammonia storage level in the SCR is provided.

Figure 1:
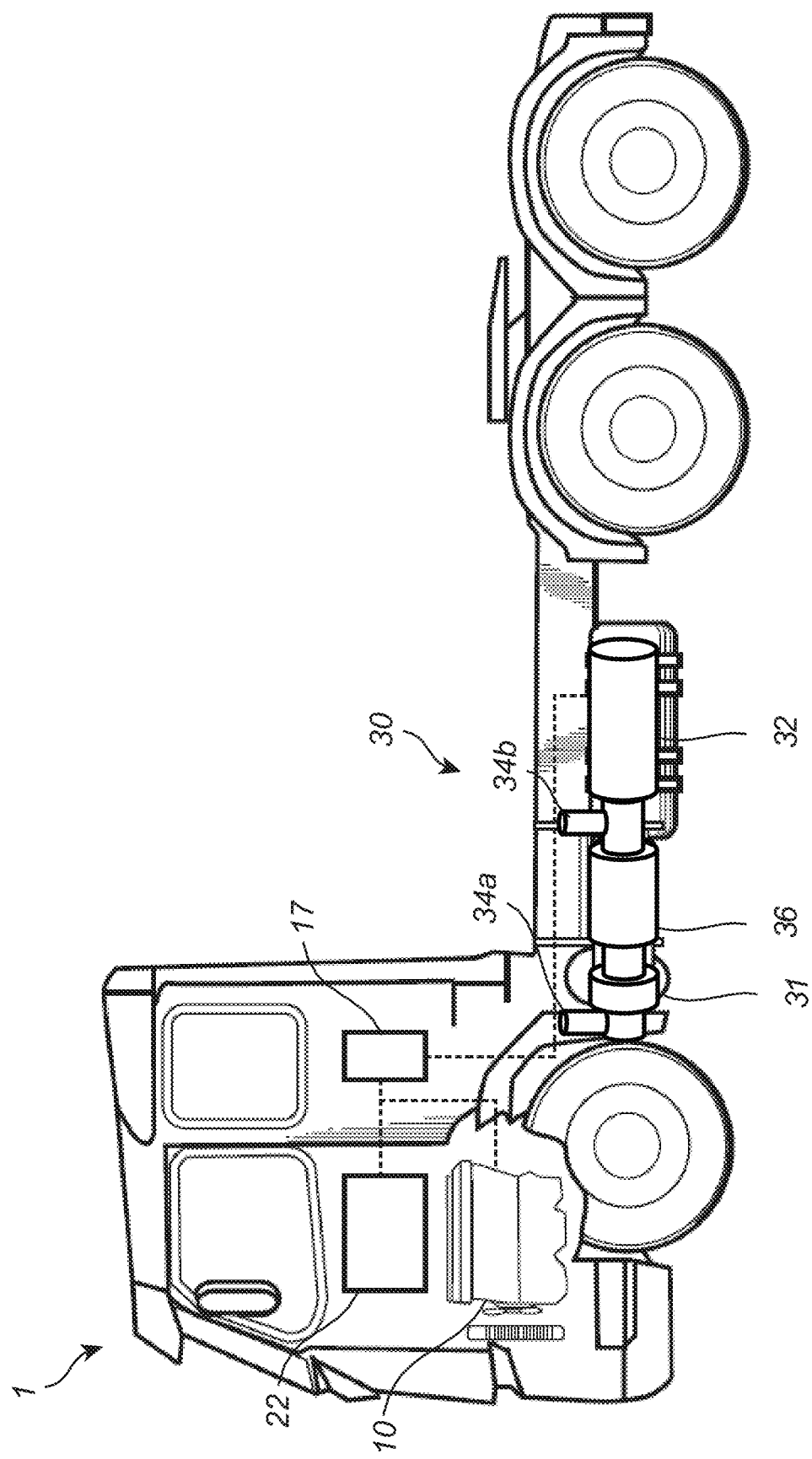
FIG. 1 is an exemplary, partly schematic, side view of an electric vehicle comprising an exhaust after treatment system including at least one SCR catalyst, and a processing circuitry according to one example.

FIG. 1 shows a vehicle 1 in the form of an exemplary heavy duty truck. The vehicle 1 illustrated in FIG. 1 comprises an internal combustion engine 10 for propelling the vehicle 1. However, as shown in FIG. 1, the vehicle may be an electric vehicle, such as a hybrid, comprising at least one electric machine 22 (as an electric traction machine) powered by an energy storage system (not shown). The combustion engine 10 is powered by fuel, such as gaseous fuel (e.g., hydrogen) or liquid fuel (e.g., diesel), typically carried in a fuel tank (not shown) and the electric machine 22 is powered by electricity supplied from at least one energy storage or transformation device, e.g., a battery or a fuel cell. The combustion engine 10 and the electric machine 22 are typically arranged and configured to individually propel the vehicle 1, by being separately coupled to other parts of the powertrain of the vehicle 1, such as a transmission, drive shafts and wheels (not shown in detail). That is, the vehicle 1 may be propelled by the combustion engine 10 alone, the electric machine 22 alone, or by the combustion engine 10 together with the electric machine 22.

In FIG. 1, the combustion engine 10 is coupled to an exhaust after treatment system 30 for treating the engine exhausts, the after treatment system comprising at least one SCR catalyst 31, 32 and an optional filter 36. The filter is arranged and configured to remove particles, e.g., particulate matter or soot, from the engine exhausts. In case the combustion engine 10 is a diesel engine, the filter 34 is a DPF, or diesel particulate filter. In the example of FIG. 1, the exhaust after treatment system 30 comprises a pre-SCR catalyst 31 arranged upstream of the filter 36, and a main SCR catalyst 32 arranged downstream of the filter 36. The exhaust after treatment system 30 may comprise an optional oxidation catalyst, e.g., arranged upstream of the filter 36. In case the combustion engine 10 is a diesel engine, the oxidation catalyst is a DOC, or diesel oxidation catalyst.

The SCR catalysts 31, 32 are arranged and configured to convert nitrogen oxides, also referred to as NOx, with the aid of a catalyst, into diatomic nitrogen (N2), and water (H2O). A reductant, typically anhydrous ammonia, aqueous ammonia or urea solution (commonly referred to as urea in the present disclosure), is added to engine exhausts and is absorbed onto the catalyst in each one of the pre-SCR catalyst 31 and main SCR catalyst 32. Thus, the exhaust after treatment system 30 comprises at least one injector 34*a*, 34*b*, here exemplified as a first injector 34*a* arranged upstream of the pre-SCR catalyst 31 and configured for injected reductant to the pre-SCR catalyst 31, and a second injector 34b arranged upstream of the main SCR catalyst 32 and configured for injected reductant to the main SCR catalyst 32.

The vehicle 1 comprises a processing circuitry 17, typically comprised in a computer system or a controlling unit of the vehicle 1. The processing circuitry is configured to control at least some of the operation of the vehicle 1, such as e.g., the injection of reductant in the exhaust after treatment system 30.

Figure 2:
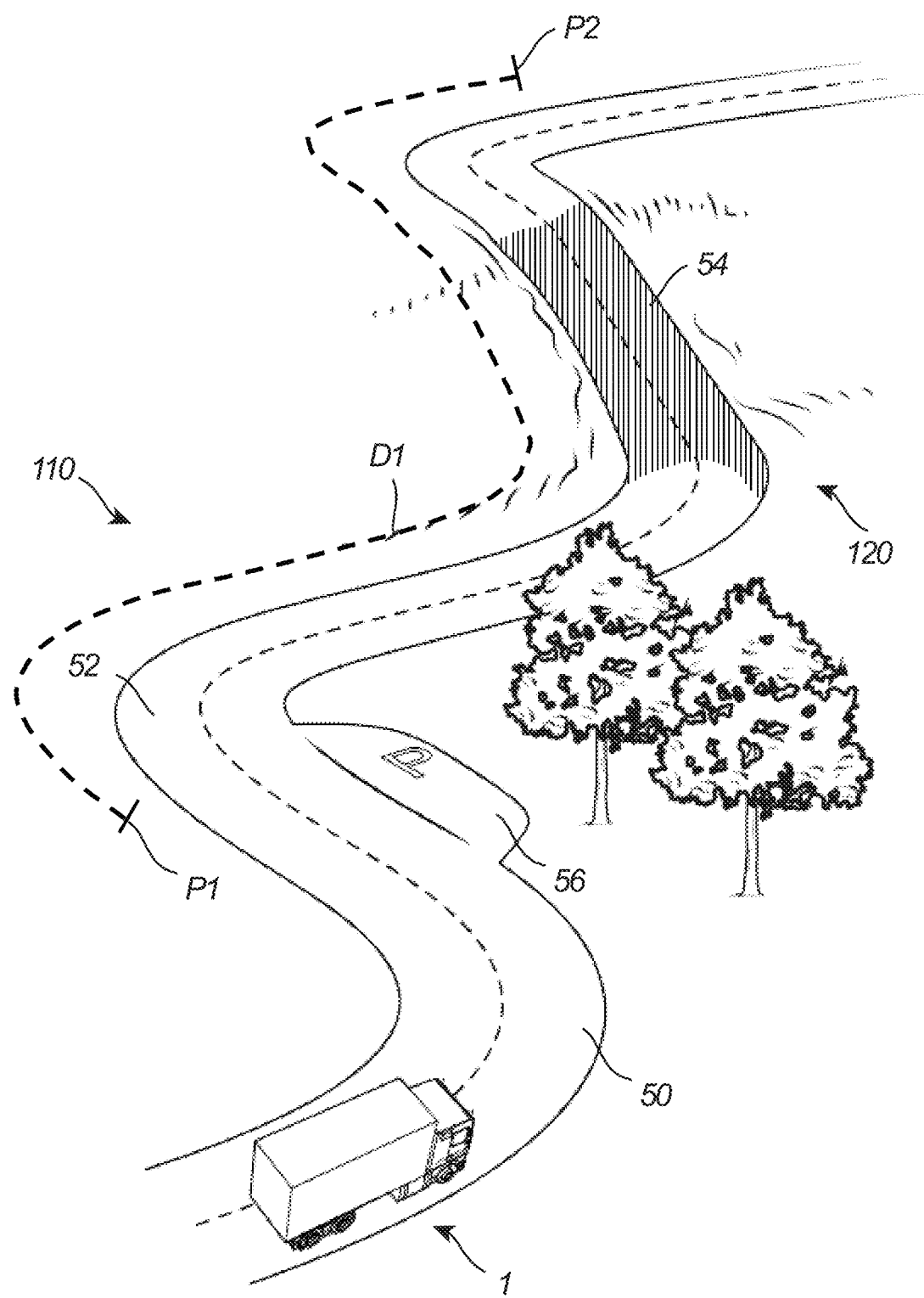
FIG. 2 is a perspective view of the vehicle of FIG. 1 travelling along a predicted travel route according to one example.

In FIG. 2, the vehicle 1 is travelling along a road 50 and is approaching a road curve 52 and uphill 54. Moreover, a parking lot 56, in which the vehicle 1 may park, is present further down the road 50 on the right-hand side of vehicle 1. The road curve 52, the uphill 54 and parking lot 56 are examples of upcoming road events 52, 54, 56.

The processing circuitry 17 may be configured to determine predicted vehicle operational information for the vehicle 1, including at least a predicted travel route 110 for the vehicle 1, a predicted shutdown of a combustion engine 10 of the vehicle 1 along the predicted travel route 110, and a predicted subsequent re-start of the combustion engine 10. For example, the predicted vehicle operational information is based on map data, e.g., including the road events 52, 54, 56, and on scheduled, or predicted, operation of the vehicle 1 in the near future, e.g., up to 10 min, or up to 30 min. The predicted vehicle operational information may thus be based on the predicted vehicle operation for the upcoming road 50 which the vehicle is travelling on, including encountering road events such as the road curve 52 and the uphill 54. Moreover, the predicted vehicle operational information may be based on scheduled information of the vehicle 1, such as which route to travel, and when and where to stop, such as e.g., parking at the parking lot 56 (e.g., for charging a battery of the vehicle 1). The predicted vehicle operation information may alternatively or additionally be based on current or predicted traffic conditions (e.g., expected traffic jams) on the predicted travel route 110. Thus, the predicted shutdown of the combustion engine 10 of the vehicle 1 along the predicted travel route 110 may be in response to a scheduled stop at the parking lot 56, or in response to a predicted shutdown of the combustion engine 10 as the electric machine 22 is expected to propel the vehicle 1 alone, without a contribution from the combustion engine 10 (e.g., due to a satisfactory state of charge of the battery, or due to an upcoming downhill), at least for a portion of the predicted travel route 110. Correspondingly, the predicted subsequent re-start of the combustion engine 10 (i.e., subsequent to the shutdown of the combustion engine 10) may be in response to a scheduled start of the vehicle after the stop at the parking lot 56, or in response to a predicted re-start of the combustion engine 10 as the electric machine 22 no longer is to propel the vehicle 1 alone (e.g., due to an un-satisfactory state of charge of the battery, or due to an upcoming uphill for which the propulsion power form the combustion engine 10 is needed in addition to the propulsion power of the electric machine 22), at least for a portion of the predicted travel route 110.

The processing circuitry 17 is further configured to determine the topography 120 of the predicted travel route 110. Thus, the processing circuitry 17 may determine the topography of the road 50, including the road curve 52 and the uphill 54. With reference to predicted re-start of the combustion engine 10, the processing circuitry is configured to determine the topography 120 of the predicted travel route 110 subsequent to the predicted re-start of the combustion engine 10, i.e., the route which the vehicle 1 is predicted to travel subsequent to the predicted re-start of the combustion engine 10. For example, the topography 120 may be that of the road 50 after the parking lot 56, i.e., including the road curve 52 and the uphill 54, in case the re-start of the combustion engine 10 is predicted to occur in the parking lot 56 after a scheduled stop. The topography 120 alternatively may be that of the road 50 just prior to the uphill 54 and onwards for a predicted distance, in case the re-start of the combustion engine 10 is predicted based on the additional need of the propulsion power from the combustion engine 10 for the uphill 54. Moreover, the processing circuitry 17 may be further configured to determine the topography 120 of the predicted travel route 110 subsequent to the predicted re-start of the combustion engine 10 for a predetermined distance D1 along the predicted travel route 110. In FIG. 2, the predetermined distance D1 is marked alongside the road 50 to indicate the distance of the predicted travel route 110. In the example of FIG. 2, the predetermined distance D1 extends from a start position P1 of the predicted travel route 110 corresponding to the position of the re-start of the combustion engine 10, here being at the parking lot 52, to an end position P2 of the predicted travel route 110, here being after the uphill 54.

The processing circuitry 17 is further configured to determine a set ammonia storage level threshold of at least one of the SCR, catalysts 31, 32 in response to the topography 120 of the predicted travel route 110 subsequent to the predicted combustion engine re-start. For example, in response to the topography 120 of the predicted travel route 110 after the combustion engine re-start, the processing circuitry 17 may be configured to predict a needed ammonia storage level for handling emissions out of the exhaust after treatment system 30 in a desired manner, and thus set the ammonia storage level threshold corresponding to such needed ammonia storage level. The processing circuitry 17 may be further configured to: determine a current ammonia storage level of the pre-SCR catalyst 31 and/or the main SCR catalyst 32 and determine a required change in ammonia storage level compared to the current ammonia storage level for reaching the ammonia storage level threshold. The required change in ammonia storage level compared to the current ammonia storage level may correspond to an increase or a decrease in ammonia storage level.

For example, in case the determined topography indicates an uphill, for example that the determined topography is identified as belonging to the predefined group of uphill dominated topographies, a temperature increase in the exhaust after treatment system is expected, and a decrease in the ammonia storage level of the SCR catalyst may be achieved in order to reduce the ammonia slip. According to another example, in case the determined topography indicates a downhill, for example that the determined topography is identified as belonging to the predefined group of downhill dominated topographies, a temperature decrease in the exhaust after treatment system is expected, and an increase in the ammonia storage level of the SCR catalyst may be achieved in order to reduce the NOx emission. Moreover, for a determined topography which is identified as belonging to the predefined group of downhill dominated topographies, a new engine shutdown may be expected potentially together with a new corresponding ammonia storage prior to such engine shutdown (as previously described).

The processing circuitry 17 is further configured to control at least one of the injectors 34a, 34b to inject a predetermined amount of reductant for providing ammonia to the at least one SCR catalyst 31, 32 and achieving the set ammonia storage level threshold prior to shutdown of the combustion engine 10. For example, the processing circuitry 17 is configured to control the first injector 34a to inject the predetermined amount of reductant for providing ammonia to the pre-SCR catalyst 31, and achieving the set ammonia storage level threshold for the pre-SCR catalyst 31 prior to shutdown of the combustion engine 10 and/or the processing circuitry 17 is configured to control the second injector 34b to inject the predetermined amount of reductant for providing ammonia to the main SCR catalyst 32, and achieving the set ammonia storage level threshold for the main SCR catalyst 32 prior to shutdown of the combustion engine 10.

For example, the processing circuitry 17 is further configured to: evaluate the determined topography 120 of the predicted travel route 110 subsequent to the predicted re-start of the combustion engine 10, and in response to the topography 120 of the predicted travel route 110 being identified as belonging to a predefined group of downhill dominated topographies, determine that the set ammonia storage level threshold corresponds to a first predetermined amount of reductant to be injected by the injector prior to shutdown of the combustion engine, and in response to the topography 120 of the predicted travel route 110 being identified as belonging to a predefined group of uphill dominated topographies, determine that the set ammonia storage level threshold corresponds to a second predetermined amount of reductant to be injected by the injector prior to shutdown of the combustion engine, wherein the second predetermined amount is smaller than the first predetermined amount. Hence, the processing circuitry 17 may be configured to evaluate the determined topography 120 and compare the result to predefined groups of topographies, i.e., at least the group of downhill dominated topographies and the group of uphill dominated topographies. For example, and referring to FIG. 2, the topography 120 for the predicted travel route may be identified, by the processing circuitry 17, as belonging to the predefined group of uphill dominated topographies, as the predicted travel route 110 comprises the uphill 54, and no downhill, at least not along the predetermined distance D1. The first predetermined amount of reductant to be injected by the first and/or second injector 34a, 34b prior to shutdown of the combustion engine 10 may for example correspond to the maximum amount of reductant which the corresponding injector 34a, 34b is able to inject prior to shutdown of the combustion engine 10. Thus, the processing circuit 17 may control the corresponding injector 34a, 34b to inject reductant to maximize the ammonia storage in the pre-SCR catalyst 31 and/or the main SCR catalyst 32 prior to the shutdown of the combustion engine 10.

The processing circuitry 17 may be further configured to: predict NOx emissions out of the exhaust after treatment system 30 for the vehicle 1 travelling on the predicted travel route 110 with the predicted topography 120, compare the predicted NOx emissions with a predetermined NOx emission threshold, and determine the set ammonia storage level threshold in response to a difference between the predicted NOx emissions and the predetermined NOx emission threshold. Thus, the processing circuitry 17 may be configured to prepare the pre-SCR catalyst 31 and/or the main SCR catalyst 32 with an ammonia storage level adapted to handle NOx emission out of the exhaust after treatment system 30 as the vehicle 1 travels along the predicted travel route 110 subsequent to the combustion engine re-start 10.

The processing circuitry 17 may be further configured to: predict ammonia slip out of the exhaust after treatment system 30 for the vehicle 1 travelling on the predicted travel route 110 with the predicted topography 120, compare the predicted ammonia slip with a predetermined ammonia slip threshold, and determine the set ammonia storage level threshold in response to a difference between the predicted ammonia slip and the predetermined ammonia slip threshold. Thus, the processing circuitry 17 may be configured to prepare the pre-SCR catalyst 31 and/or the main SCR catalyst 32 with an ammonia storage level adapted to handle ammonia slip out of the exhaust after treatment system 30 as the vehicle 1 travels along the predicted travel route 110 subsequent to the combustion engine re-start 10.

The processing circuitry 17 may be configured to predict NOx emissions and/or the predict ammonia slip in response to predicted engine speed and/or predicted engine torque of the predicted vehicle operational information for the vehicle 1 travelling along the predicted travel route 110 subsequent to combustion engine re-start. For example, by recognizing the uphill 54, and e.g., the length and inclination of the uphill 54, a vehicle operation to which the gear is to be adapted (typically downshifting for increased engine torque) and an associated engine speed and engine torque may be predicted. In other words, the predicted vehicle operation is at least partly defined by the predicted engine operation (here downshifting and the proper engine speed and engine torque). In a corresponding manner, the road curve 52 (e.g., being a steep road curve 52) may be associated with a predicted engine operation of reduced engine speed, and the parking lot 56 may be associated with a predicted engine operation of engine shutdown. Other upcoming road events may e.g., be a downhill with the associated predicted engine operation of shutdown of the combustion engine 10 (i.e., only propelling the vehicle 1 with the electric machine 22). For the predicted vehicle operations, and the associated predicted engine operations, the corresponding NOx emissions and/or the ammonia slip may be predicted, e.g., by using an exhaust after treatment system model correlating the predicted engine operation with the predicted NOx emissions and/or the ammonia slip, or using a look-up table with estimated NOx emissions and ammonia slip for the predicted engine operation.

Figure 3:
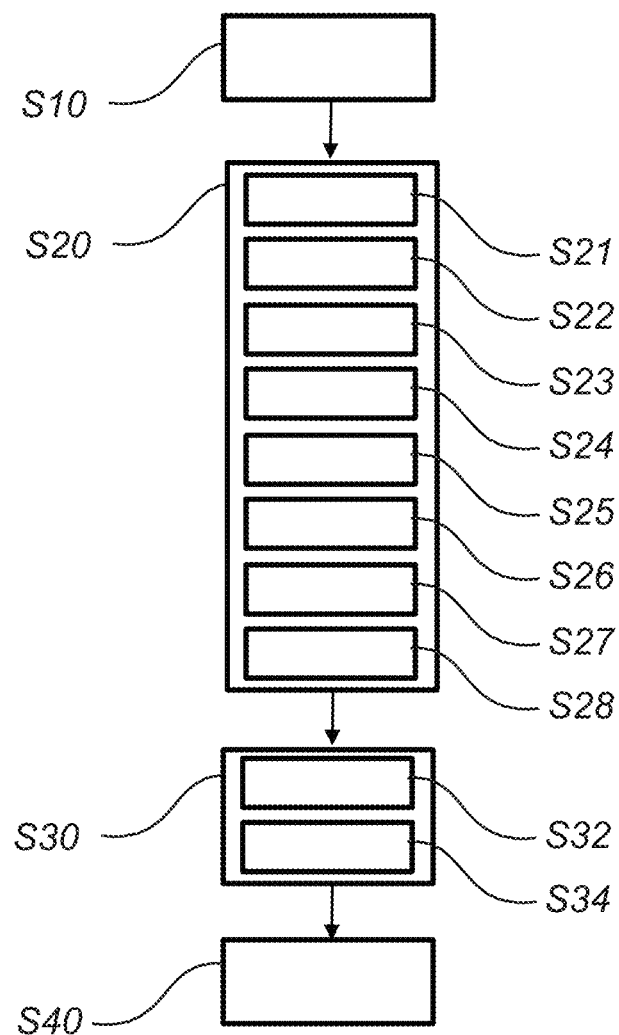
FIG. 3 is a flowchart is a flow chart of an exemplary method according to one example.

FIG. 3 is a flow chart of a computer-implemented method for controlling at least a part of an exhaust after treatment system of a vehicle 1, such as the exhaust after treatment system 30 of the vehicle 1 of FIGS. 1-2. Thus, reference is further made to features described in FIGS. 1-2 in the following.

In a first action or step, S10, predicted vehicle operational information including at least predicted travel route 110 for a vehicle 1, a predicted shutdown of a combustion engine 10 of the vehicle 1 along the predicted travel route 110, and a predicted subsequent re-start of the combustion engine 10, is determined by a processing circuitry 17 of a computer system. The first action or step S10 may comprise receiving, by the processor circuitry 17, predicted vehicle operational information from a route planner of the vehicle 1. Thus, the predicted vehicle operational information may comprise scheduled, or predicted, operation of the vehicle 1, such as travelling along the road 50 in FIG. 2.

In a second, optional action or step S20, the topography 120 of the predicted travel route 110 subsequent to the predicted re-start of the combustion engine 10 is determined by the processor circuitry 17. As previously described, the predicted vehicle operational information may comprise map data, e.g., including the road events 52, 54, 56 and road topography. In an optional sub-step or sub-action S21 to the second action or step S20, the topography 120 of the predicted travel route 110 subsequent to the predicted restart of the combustion engine 10 is determined, by the processing circuitry 17, for a predetermined distance D1 along the predicted travel route 110. This predetermined distance D1 may extend from a start position P1 of the predicted travel route 110 corresponding to the position of the re-start of the combustion engine 10, to an end position P2 of the predicted travel route 110, as exemplified with reference to FIG. 2.

In a third action or step S30, a set ammonia storage level threshold of a selective catalytic reduction, SCR, catalyst 31, 32 arranged in an exhaust after treatment system 30 to the combustion engine 10 in response to the topography 120 of the predicted travel route 110 subsequent to the predicted combustion engine re-start is determined by the processor circuitry 17. Thus, the vehicle 1 may comprise the exhaust after treatment system 30 of FIGS. 1-2, wherein the SCR catalyst 31, 32 is either referring to the pre-SCR catalyst 31, to the main SCR catalyst 32 or to both the pre-SCR catalyst 31 and the main SCR catalyst.

In a fourth action or step S40, an injector 34a, 34b of the exhaust after treatment system 30 is controlled, by the processing circuitry 17, to inject a predetermined amount of reductant for providing ammonia to the SCR catalyst 31, 32 and achieving the set ammonia storage level threshold prior to shutdown of the engine 10. Thus, the vehicle 1 may comprise the exhaust after treatment system 30 of FIG. 1, wherein the injector 34a, 34b is either referring to the first injector 34a, the second injector 34b or to both the first and second injectors 34a, 34b.

In an optional sub-action or sub-step S32 to the third action or step S30, a current ammonia storage level of the SCR catalyst 31, 32 is determined by the processing circuitry 17, and in another sub-action or sub-step S34a, S34b to the third action or step S30, a required change in ammonia storage level compared to the current ammonia storage level for reaching the ammonia storage level threshold is determined by the processing circuitry 17. The required change in ammonia storage level may be an increase compared to the current ammonia storage level, as in sub-action or sub-step S34a, by controlling, by the processing circuitry 17, the injector 34a, 34b to increase the rate of the injected reductant, or the required change in ammonia storage level may be a decrease compared to the current ammonia storage level, as in sub-action or sub-step S34b, by controlling, by the processing circuitry 17, the ejector 34a, 34b to decrease the rate of the injected reductant.

In a first series of sub-actions or sub-steps S22, S23, S24 to the second action or step S20, the determined topography 120 of the predicted travel route 110 is evaluated S22, by the processing circuitry 17, subsequent to the predicted re-start of the combustion engine 10. Moreover, in response to the topography 120 of the predicted travel route 110 being identified as belonging to a predefined group of downhill dominated topographies, it is determined S23, by the processing circuitry 17, that the set ammonia storage level threshold corresponds to a first predetermined amount of reductant to be controlled to be injected by the injector 34a, 34b prior to shutdown of the combustion engine 10. Moreover, in response to the topography 120 of the predicted travel route 110 being identified as belonging to a predefined group of uphill dominated topographies, it is determined S24, by the processing circuitry 17, that the set ammonia storage level threshold corresponds to a second predetermined amount of reductant to be controlled to be injected by the injector 34a, 34b prior to shutdown of the combustion engine 10. The second predetermined amount is smaller than the first predetermined amount. Hence, the determined topography 120 may be evaluated and compared to predefined groups of topographies, i.e., at least the group of downhill dominated topographies and the group of uphill dominated topographies, e.g., by using look-up tables.

In a second series of sub-actions or sub-steps S25, S26 to the second action or step S20, NOx emissions out of the exhaust after treatment system 30 for the vehicle 1 travelling on the predicted travel route 110 with the predicted topography 120, is predicted S25 by the processing circuitry 17, and the predicted NOx emissions is compared S26, by the processing circuitry 17, with a predetermined NOx emission threshold. Hereby, the third step or action S30 may be carried out by determining the set ammonia storage level threshold in response to a difference between the predicted NOx emissions and the predetermined NOx emission threshold.

In a third series of sub-actions or sub-steps S27, S28 to the second action or step S20, ammonia slip out of the exhaust after treatment system 30 for the vehicle 1 travelling on the predicted travel route 110 with the predicted topography 120, is predicted S27 by the processing circuitry 17, and the predicted ammonia slip is compared S28, by the processing circuitry 17, with a predetermined ammonia slip threshold. Hereby, the third step or action S30 may be carried out by determining the set ammonia storage level threshold in response to a difference between the predicted ammonia slip and the predetermined ammonia slip threshold.

Thus, preparation of the pre-SCR catalyst 31 and/or the main SCR catalyst 32 with an ammonia storage level adapted to handle NOx emissions or ammonia slip out of the exhaust after treatment system 30 as the vehicle 1 travels along the predicted travel route 110 subsequent to the combustion engine re-start 10 can be advantageously achieved.

Figure 4:
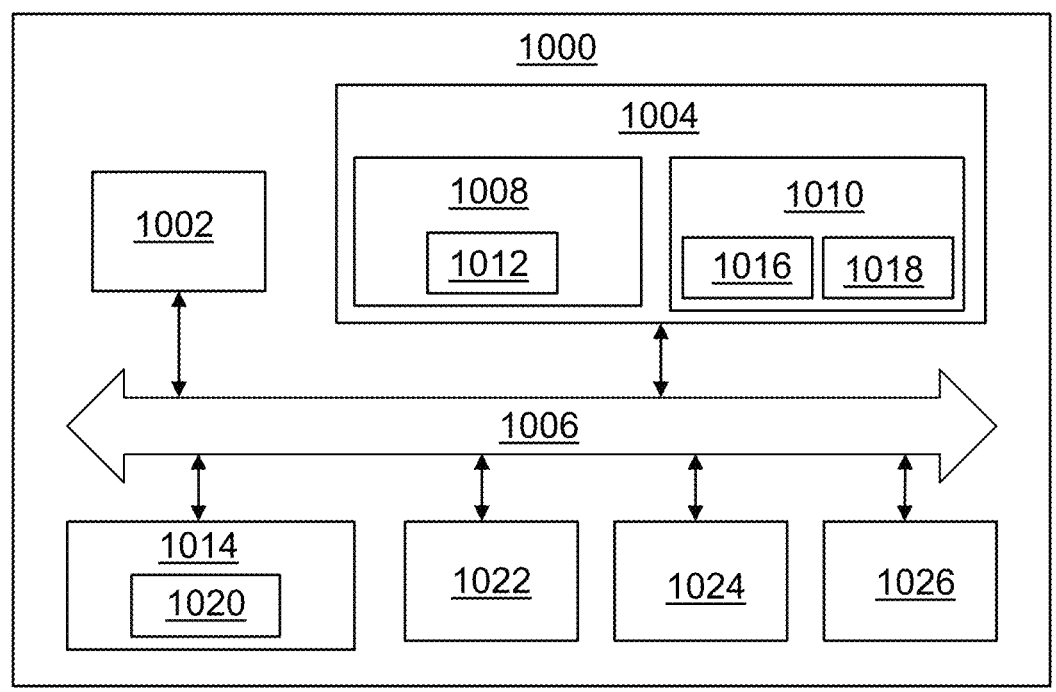
FIG. 4 is a schematic diagram of an exemplary computer system for implementing examples disclosed herein, according to an example.

FIG. 4 is a schematic diagram of a computer system 1000 for implementing examples disclosed herein, e.g., the method as described with reference to FIG. 3. The computer system 1000 is adapted to execute instructions from a computer-readable medium to perform these and/or any of the functions or processing described herein. The computer system 1000 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1. A computer system comprising processing circuitry configured to: determine predicted vehicle operational information for a vehicle associated with the computer system including at least a predicted travel route for the vehicle, a predicted shutdown of a combustion engine of the vehicle along the travel route, and a predicted subsequent re-start of the combustion engine; determine the topography of the predicted travel route subsequent to the predicted re-start of the combustion engine; determine a set ammonia storage level threshold of a selective catalytic reduction, SCR, catalyst arranged in an exhaust after treatment system to the combustion engine in response to the topography of the predicted travel route subsequent to the predicted combustion engine re-start; and control an injector of the exhaust after treatment system to inject a predetermined amount of reductant for providing ammonia to the SCR catalyst and achieving the set ammonia storage level threshold prior to shutdown of the combustion engine.

Example 2. The computer system of example 1, wherein the processing circuitry is further configured to: determine a current ammonia storage level of the SCR catalyst; and determine a required change in ammonia storage level compared to the current ammonia storage level for reaching the ammonia storage level threshold.

Example 3. The computer system of example 2, wherein the required change in ammonia storage level compared to the current ammonia storage level corresponds to an increase or a decrease in ammonia storage level.

Example 4. The computer system of any of examples 1-3, wherein, the processing circuitry is further configured to: evaluate the determined topography of the predicted travel route subsequent to the predicted re-start of the combustion engine, and in response to the topography of the predicted travel route being identified as belonging to a predefined group of downhill dominated topographies, determine that the set ammonia storage level threshold corresponds to a first predetermined amount of reductant to be injected by the injector prior to shutdown of the combustion engine, and in response to the topography of the predicted travel route being identified as belonging to a predefined group of uphill dominated topographies, determine that the set ammonia storage level threshold corresponds to a second predetermined amount of reductant to be injected by the injector prior to shutdown of the combustion engine, wherein the second predetermined amount is smaller than the first predetermined amount.

Example 5. The computer system of example 4, wherein the first predetermined amount of reductant to be injected by the injector prior to shutdown of the combustion engine corresponds to the maximum amount of reductant which the injector is able to inject prior to shutdown of the combustion engine.

Example 6. The computer system of any of examples 1-5, wherein the processing circuitry is further configured to: determine the topography of the predicted travel route subsequent to the predicted re-start of the combustion engine for a predetermined distance along the travel route. A technical benefit may include a well-define distance of the predicted travel route subsequent to restart of the combustion engine.

Example 7. The computer system of any of examples 1-6, wherein, the processing circuitry is further configured to: predict NOx emissions out of the exhaust after treatment system for the vehicle travelling on the predicted travel route with the predicted topography; compare the predicted NOx emissions with a predetermined NOx emission threshold; and determine the set ammonia storage level threshold in response to a difference between the predicted NOx emissions and the predetermined NOx emission threshold. A technical benefit may include an efficient way to ensure that the NOx emission out of the exhaust after treatment system as the vehicle travels along the predicted travel route subsequent to the combustion engine re-start is below the NOx emission threshold.

Example 8. The computer system of any of examples 1-6, wherein, the processing circuitry is further configured to: predict ammonia slip out of the exhaust after treatment system for the vehicle travelling on the predicted travel route with the predicted topography; compare the predicted ammonia slip with a predetermined ammonia slip threshold; and determine the set ammonia storage level threshold in response to a difference between the predicted ammonia slip and the predetermined ammonia slip threshold.

Example 9. The computer system of any of examples 1-8, wherein the SCR catalyst is a pre-SCR catalyst arranged upstream of a main SCR-catalyst in the exhaust after treatment system or, wherein the SCR catalyst is the main-SCR catalyst arranged downstream of the pre-SCR catalyst.

Example 10. A vehicle comprising the computer system of any of examples 1-9.

Example 11. The vehicle of example 10, further comprising: an electric machine for propelling the vehicle in addition to the combustion engine.

Example 12. A computer-implemented method is provided. The method comprises determining, by processing circuitry of a computer system, predicted vehicle operational information including at least predicted travel route for a vehicle, a predicted shutdown of a combustion engine of the vehicle along the travel route, and a predicted subsequent re-start of the combustion engine; determining, by the processing circuitry, the topography of the predicted travel route subsequent to the predicted re-start of the combustion engine; determining, by the processing circuitry, a set ammonia storage level threshold of a selective catalytic reduction, SCR, catalyst arranged in an exhaust after treatment system to the combustion engine in response to the topography of the predicted travel route subsequent to the predicted combustion engine re-start; and controlling an injector of the exhaust after treatment system to inject a predetermined amount of reductant for providing ammonia to the SCR catalyst and achieving the set ammonia storage level threshold prior to shutdown of the engine.

Example 13. The method of example 12, further comprising: determining, by the processing circuitry, a current ammonia storage level of the SCR catalyst; and determining, by the processing circuitry, a required change in ammonia storage level compared to the current ammonia storage level for reaching the ammonia storage level threshold.

Example 14. The method of example 13, wherein the injector is controlled to achieve the required change in ammonia storage level compared to the current ammonia storage level by an increase or a decrease in ammonia storage level.

Example 15. The method of any of examples 12-14, further comprising: evaluating, by the processing circuitry, the determined topography of the predicted travel route subsequent to the predicted re-start of the combustion engine; determining, by the processing circuitry, that the set ammonia storage level threshold corresponds to a first predetermined amount of reductant to be controlled to be injected by the injector prior to shutdown of the combustion engine in response to the topography of the predicted travel route being identified as belonging to a predefined group of downhill dominated topographies; and determining, by the processing circuitry, that the set ammonia storage level threshold corresponds to a second predetermined amount of reductant to be controlled to be injected by the injector prior to shutdown of the combustion engine in response to the topography of the predicted travel route being identified as belonging to a predefined group of uphill dominated topographies, wherein the second predetermined amount is smaller than the first predetermined amount.

Example 16. The method of any of examples 12-15, further comprising: determining, by the processing circuitry, the topography of the predicted travel route subsequent to the predicted re-start of the combustion engine for a predetermined distance along the predicted travel route.

Example 17. The method of any of examples 12-16, further comprising: predicting, by the processing circuitry, NOx emissions out of the exhaust after treatment system for the vehicle travelling on the predicted travel route with the predicted topography; comparing, by the processing circuitry, the predicted NOx emissions with a predetermined NOx emission threshold; wherein determining the set ammonia storage level threshold is performed in response to a difference between the predicted NOx emissions and the predetermined NOx emission threshold.

Examples 18. The method of any of examples 12-16, further comprising: predicting, by the processing circuitry, ammonia slip out of the exhaust after treatment system for the vehicle travelling on the predicted travel route with the predicted topography; comparing, by the processing circuitry, the predicted ammonia slip with a predetermined ammonia slip threshold; wherein determining the set ammonia storage level threshold is performed in response to a difference between the predicted ammonia slip and the predetermined ammonia slip threshold.

Example 19. A computer program product comprising program code for performing, when executed by the processing circuitry, the method of any of examples 12-18.

Example 20. A non-transitory computer-readable storage medium comprising instructions, which when executed by the processing circuitry, cause the processing circuitry to perform the method of any of examples 12-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:
    determine predicted vehicle operational information for a vehicle associated with the computer system including at least predicted travel route for the vehicle, a predicted shutdown of a combustion engine of the vehicle along the predicted travel route, and a predicted subsequent re-start of the combustion engine;
    determine a topography of the predicted travel route subsequent to the predicted re-start of the combustion engine;
    determine a set ammonia storage level threshold of a selective catalytic reduction, SCR, catalyst arranged in an exhaust after treatment system to the combustion engine in response to the topography of the predicted travel route subsequent to the predicted combustion engine re-start; and
    control an injector of the exhaust after treatment system to inject a predetermined amount of reductant for providing ammonia to the SCR catalyst and achieving the set ammonia storage level threshold prior to shutdown of the combustion engine.

2. The computer system of claim 1, wherein the processing circuitry is further configured to:
    determine a current ammonia storage level of the SCR catalyst; and
    determine a required change in ammonia storage level compared to the current ammonia storage level for reaching the ammonia storage level threshold.

3. The computer system of claim 2, wherein the required change in ammonia storage level compared to the current ammonia storage level corresponds to an increase or a decrease in ammonia storage level.

4. The computer system of claim 1, wherein the processing circuitry is further configured to:
    evaluate the determined topography of the predicted travel route subsequent to the predicted re-start of the combustion engine;
    in response to the topography of the predicted travel route being identified as belonging to a predefined group of downhill dominated topographies, determine that the set ammonia storage level threshold corresponds to a first predetermined amount of reductant to be injected by the injector prior to shutdown of the combustion engine; and
    in response to the topography of the predicted travel route being identified as belonging to a predefined group of uphill dominated topographies, determine that the set ammonia storage level threshold corresponds to a second predetermined amount of reductant to be injected by the injector prior to shutdown of the combustion engine, wherein the second predetermined amount is smaller than the first predetermined amount.

5. The computer system of claim 4, wherein the first predetermined amount of reductant to be injected by the injector prior to shutdown of the combustion engine corresponds to the maximum amount of reductant which the injector is able to inject prior to shutdown of the combustion engine.

6. The computer system of claim 1, wherein the processing circuitry is further configured to: determine the topography of the predicted travel route subsequent to the predicted re-start of the combustion engine for a predetermined distance along the predicted travel route.

7. The computer system of claim 1, wherein the processing circuitry is further configured to:
predict NOx emissions out of the exhaust after treatment system for the vehicle travelling on the predicted travel route with the topography;
compare the predicted NOx emissions with a predetermined NOx emission threshold; and
determine the set ammonia storage level threshold in response to a difference between the predicted NOx emissions and the predetermined NOx emission threshold.

8. The computer system of claim 1, wherein the processing circuitry is further configured to:
predict ammonia slip out of the exhaust after treatment system for the vehicle travelling on the predicted travel route with the topography;
compare the predicted ammonia slip with a predetermined ammonia slip threshold; and
determine the set ammonia storage level threshold in response to a difference between the predicted ammonia slip and the predetermined ammonia slip threshold.

9. The computer system of claim 1, wherein the SCR catalyst is a pre-SCR catalyst arranged upstream of a main SCR-catalyst in the exhaust after treatment system or, wherein the SCR catalyst is the main-SCR catalyst arranged downstream of the pre-SCR catalyst.

10. A vehicle comprising the computer system of claim 1.

11. The vehicle of claim 10, further comprising an electric machine for propelling the vehicle in addition to the combustion engine.

12. A computer-implemented method, comprising:
determining, by processing circuitry of a computer system, predicted vehicle operational information including at least predicted travel route for a vehicle, a predicted shutdown of a combustion engine of the vehicle along the predicted travel route, and a predicted subsequent re-start of the combustion engine;
determining, by the processing circuitry, a topography of the predicted travel route subsequent to the predicted re-start of the combustion engine;
determining, by the processing circuitry, a set ammonia storage level threshold of a selective catalytic reduction, SCR, catalyst arranged in an exhaust after treatment system to the combustion engine in response to the topography of the predicted travel route subsequent to the predicted combustion engine re-start; and
controlling an injector of the exhaust after treatment system to inject a predetermined amount of reductant for providing ammonia to the SCR catalyst and achieving the set ammonia storage level threshold prior to shutdown of the combustion engine.

13. The method of claim 12, further comprising:
determining, by the processing circuitry, a current ammonia storage level of the SCR catalyst; and
determining, by the processing circuitry, a required change in ammonia storage level compared to the current ammonia storage level for reaching the ammonia storage level threshold.

14. The method of claim 13, wherein the injector is controlled to achieve the required change in ammonia storage level compared to the current ammonia storage level by an increase or a decrease in ammonia storage level.

15. The method of claim 12, further comprising:
evaluating, by the processing circuitry, the determined topography of the predicted travel route subsequent to the predicted re-start of the combustion engine;
determining, by the processing circuitry, that the set ammonia storage level threshold corresponds to a first predetermined amount of reductant to be controlled to be injected by the injector prior to shutdown of the combustion engine in response to the topography of the predicted travel route being identified as belonging to a predefined group of downhill dominated topographies; and
determining, by the processing circuitry, that the set ammonia storage level threshold corresponds to a second predetermined amount of reductant to be controlled to be injected by the injector prior to shutdown of the combustion engine in response to the topography of the predicted travel route being identified as belonging to a predefined group of uphill dominated topographies, wherein the second predetermined amount is smaller than the first predetermined amount.

16. The method of claim 12, further comprising:
determining, by the processing circuitry, the topography of the predicted travel route subsequent to the predicted re-start of the combustion engine for a predetermined distance along the predicted travel route.

17. The method of claim 12, further comprising,
predicting, by the processing circuitry, NOx emissions out of the exhaust after treatment system for the vehicle travelling on the predicted travel route with the topography; and
comparing, by the processing circuitry, the predicted NOx emissions with a predetermined NOx emission threshold,
wherein determining the set ammonia storage level threshold is performed in response to a difference between the predicted NOx emissions and the predetermined NOx emission threshold.

18. The method of claim 12, further comprising:
predicting, by the processing circuitry, ammonia slip out of the exhaust after treatment system for the vehicle travelling on the predicted travel route with the topography; and
comparing, by the processing circuitry, the predicted ammonia slip with a predetermined ammonia slip threshold,
wherein determining the set ammonia storage level threshold is performed in response to a difference between the predicted ammonia slip and the predetermined ammonia slip threshold.

19. A computer program product comprising program code for performing, when executed by the processing circuitry, the method of claim 12.

20. A non-transitory computer-readable storage medium comprising instructions, which when executed by the processing circuitry, cause the processing circuitry to perform the method of claim 12.

* * * * *